(12) United States Patent
Taylor et al.

(10) Patent No.: US 9,834,305 B2
(45) Date of Patent: Dec. 5, 2017

(54) VERTICAL TAKEOFF AND LANDING (VTOL) AIR VEHICLE

(71) Applicant: AEROVIRONMENT, INC., Monrovia, CA (US)

(72) Inventors: Dana J. Taylor, Simi Valley, CA (US); Phillip T. Tokumaru, Thousand Oaks, CA (US); Bart Dean Hibbs, Simi Valley, CA (US); William Martin Parks, Simi Valley, CA (US); David Wayne Ganzer, Simi Valley, CA (US); Joseph Frederick King, Granada Hills, CA (US)

(73) Assignee: AEROVIRONMENT, INC., Simi Valley, CA (US)

( * ) Notice: Subject to any disclaimer, the term of this patent is extended or adjusted under 35 U.S.C. 154(b) by 86 days.

(21) Appl. No.: 14/706,905

(22) Filed: May 7, 2015

(65) Prior Publication Data
US 2016/0214712 A1    Jul. 28, 2016

Related U.S. Application Data

(63) Continuation of application No. PCT/US2014/036863, filed on May 5, 2014.
(Continued)

(51) Int. Cl.
*B64C 29/00* (2006.01)
*B64C 39/02* (2006.01)
(Continued)

(52) U.S. Cl.
CPC .......... *B64C 29/0025* (2013.01); *B64C 11/32* (2013.01); *B64C 27/26* (2013.01);
(Continued)

(58) Field of Classification Search
CPC ....... B64C 11/32; B64C 27/605; B64C 29/02; B64C 39/024
See application file for complete search history.

(56) References Cited

U.S. PATENT DOCUMENTS 2,151,128 A    3/1939    Looney
2,961,189 A *  11/1960   Doak ................... B64C 29/0033
                                            244/12.4
(Continued)

FOREIGN PATENT DOCUMENTS

WO    2006022654 A1    3/2006
WO    2009066073 A1    5/2009
(Continued)

OTHER PUBLICATIONS

Non-Final Office action for U.S. Appl. No. 14/270,320 mailed Feb. 25, 2016.
(Continued)

*Primary Examiner* — Justin Benedik
(74) *Attorney, Agent, or Firm* — Michael Zarrabian; Pejman Yedidsion; Eric Aagaard

(57) ABSTRACT

A flight control apparatus for fixed-wing aircraft includes a first port wing and first starboard wing, a first port swash plate coupled between a first port rotor and first port electric motor, the first port electric motor coupled to the first port wing, and a first starboard swash plate coupled between a first starboard rotor and first starboard electric motor, the first starboard electric motor coupled to the first starboard wing.

4 Claims, 13 Drawing Sheets

Related U.S. Application Data

(60) Provisional application No. 61/819,487, filed on May 3, 2013.

(51) Int. Cl.

| | | |
|---|---|---|
| *G05D 1/08* | (2006.01) | |
| *B64C 11/32* | (2006.01) | |
| *B64C 27/605* | (2006.01) | |
| *B64C 29/02* | (2006.01) | |
| *B64C 27/26* | (2006.01) | |
| *B64C 27/54* | (2006.01) | |
| *B64D 27/24* | (2006.01) | |

(52) U.S. Cl.
CPC ............ *B64C 27/54* (2013.01); *B64C 27/605* (2013.01); *B64C 29/00* (2013.01); *B64C 29/02* (2013.01); *B64C 39/024* (2013.01); *B64D 27/24* (2013.01); *G05D 1/0858* (2013.01); *B64C 2201/021* (2013.01); *B64C 2201/042* (2013.01); *B64C 2201/088* (2013.01); *B64C 2201/104* (2013.01); *B64C 2201/108* (2013.01); *B64C 2201/165* (2013.01)

(56) References Cited

U.S. PATENT DOCUMENTS

| | | | |
|---|---|---|---|
| 3,181,810 A * | 5/1965 | Olson ................ | B64C 29/0033 244/66 |
| 4,410,151 A | 10/1983 | Hoeppner et al. | |
| 4,814,711 A | 3/1989 | Olsen et al. | |
| 5,062,587 A | 11/1991 | Wernicke | |
| 5,289,994 A | 3/1994 | Del Campo Aguilera | |
| 5,419,514 A * | 5/1995 | Ducan ................ | B64C 29/0033 244/12.4 |
| 5,765,783 A * | 6/1998 | Albion ................ | B64C 29/02 244/17.23 |
| 6,056,237 A | 5/2000 | Woodland | |
| 7,472,863 B2 * | 1/2009 | Pak ................ | A63H 27/14 244/12.5 |
| 7,766,274 B1 | 8/2010 | Jameson et al. | |
| 8,146,855 B2 * | 4/2012 | Ismailov ................ | B64C 39/024 244/3.27 |
| 8,453,962 B2 * | 6/2013 | Shaw ................ | B64C 27/20 244/12.4 |
| 8,511,606 B1 | 8/2013 | Lutke et al. | |
| 8,590,828 B2 * | 11/2013 | Marcus ................ | B64C 29/0058 244/1 R |
| 8,602,348 B2 * | 12/2013 | Bryant ................ | B64C 29/0033 244/12.4 |
| 8,616,492 B2 * | 12/2013 | Oliver ................ | B64C 29/0033 244/12.4 |
| 8,695,916 B2 * | 4/2014 | Martin ................ | B64C 39/026 244/4 A |
| 8,733,690 B2 * | 5/2014 | Bevirt ................ | B64C 29/0033 244/12.4 |
| 8,800,912 B2 * | 8/2014 | Oliver ................ | B64C 29/0033 244/12.4 |
| 8,979,032 B1 | 3/2015 | Hester et al. | |
| 9,102,401 B2 * | 8/2015 | Collins ................ | B64C 29/0033 |
| 9,302,783 B2 | 4/2016 | Wang | |
| 9,382,003 B2 | 7/2016 | Burema et al. | |
| 9,387,928 B1 | 7/2016 | Gentry et al. | |
| 9,429,945 B2 | 8/2016 | Pulleti et al. | |
| 9,527,605 B1 | 12/2016 | Gentry et al. | |
| 9,561,871 B2 | 2/2017 | Sugumaran | |
| 2005/0066806 A1 | 3/2005 | Helms et al. | |
| 2005/0178879 A1 * | 8/2005 | Mao ................ | B64C 29/02 244/7 B |
| 2005/0231157 A1 | 10/2005 | Sanders et al. | |
| 2006/0249622 A1 | 11/2006 | Steele | |
| 2009/0236470 A1 | 9/2009 | Goossen et al. | |
| 2009/0294573 A1 | 12/2009 | Wilson et al. | |
| 2010/0131121 A1 | 5/2010 | Gerlock | |
| 2010/0157055 A1 | 6/2010 | Pechatnikov | |
| 2010/0252690 A1 * | 10/2010 | Hothi ................ | B64C 39/024 244/7 B |
| 2011/0159281 A1 | 6/2011 | Marx | |
| 2011/0168838 A1 | 7/2011 | Hornback et al. | |
| 2011/0180673 A1 * | 7/2011 | Lim ................ | B64C 29/0025 244/7 A |
| 2011/0264314 A1 | 10/2011 | Parras | |
| 2011/0303795 A1 * | 12/2011 | Oliver ................ | B64C 29/0033 244/7 R |
| 2012/0001020 A1 | 1/2012 | Miralles et al. | |
| 2012/0050090 A1 | 3/2012 | Rudnisky et al. | |
| 2012/0091257 A1 | 4/2012 | Wolff et al. | |
| 2012/0210853 A1 | 8/2012 | Abershitz et al. | |
| 2012/0318915 A1 | 12/2012 | Gatzke | |
| 2013/0161447 A1 | 6/2013 | McGeer et al. | |
| 2013/0318214 A1 | 11/2013 | Tebay et al. | |
| 2014/0032034 A1 | 1/2014 | Raptopoulos et al. | |
| 2014/0124621 A1 | 5/2014 | Godzdanker et al. | |
| 2014/0126838 A1 | 5/2014 | Schultz et al. | |
| 2014/0277834 A1 | 9/2014 | Levien et al. | |
| 2014/0316616 A1 | 10/2014 | Kugelmass | |
| 2015/0158598 A1 | 6/2015 | You | |
| 2015/0336669 A1 | 11/2015 | Kantor et al. | |
| 2016/0011592 A1 | 1/2016 | Zhang et al. | |
| 2016/0039542 A1 | 2/2016 | Wang | |
| 2016/0068265 A1 | 3/2016 | Hoareau et al. | |
| 2016/0137311 A1 | 5/2016 | Peverill et al. | |
| 2016/0196756 A1 | 7/2016 | Prakash et al. | |
| 2016/0229299 A1 | 8/2016 | Streett | |
| 2016/0253808 A1 | 9/2016 | Metzler et al. | |
| 2017/0160740 A1 | 6/2017 | Srivastava et al. | |

FOREIGN PATENT DOCUMENTS

| | | |
|---|---|---|
| WO | 2011159281 A1 | 12/2011 |
| WO | 2015012935 A2 | 1/2015 |

OTHER PUBLICATIONS

International Search Report for PCT/US16/17417 mailed Jul. 27, 2016.
International Search Report for PCT/US16/17540 mailed May 23, 2016.
International Search Report for PCT/US16/17614 mailed May 19, 2016.
International Search Report for PCT/US14/36863 mailed Mar. 20, 2015.
Oosedo, Konno, Matumoto, Go, Masuko, Abiko, and Uchiyama, "Design and Simulation of a Quad Rotor Tail-Sitter Unmanned Aerial Vehicle," Tohoku University, IEEE, 2010, 978-1-4244-9315-9/10.
European Search Report for EP Application No. 14828680.0 dated Nov. 10, 2016.
First Office Action for CN Application No. 201480033924X mailed Nov. 15, 2016.
Intellectual Property Office of Singapore Written Opinion for Application No. 11201508858P mailed Sep. 5, 2016.
International Search Report and Written Opinion for PCT/US14/36863, mailed Mar. 20, 2015.
International Search Report and Written Opinion for PCT/US16/17407 mailed Jul. 27, 2016.
International Search Report and Written Opinion for serial No. PCT/US16/17400, mailed May 12, 2016.

* cited by examiner

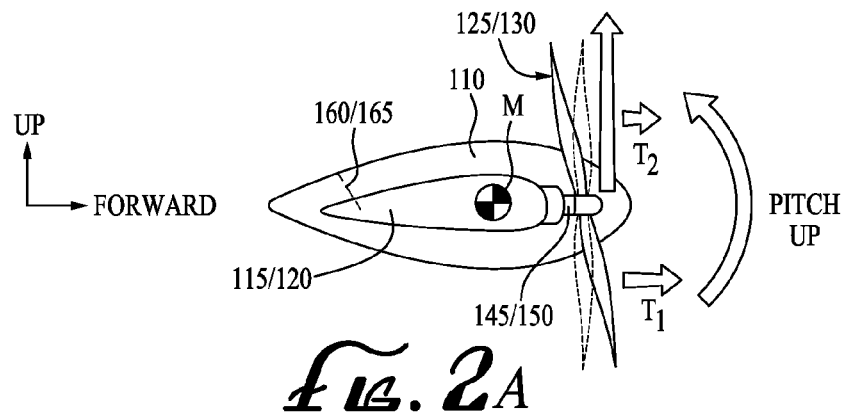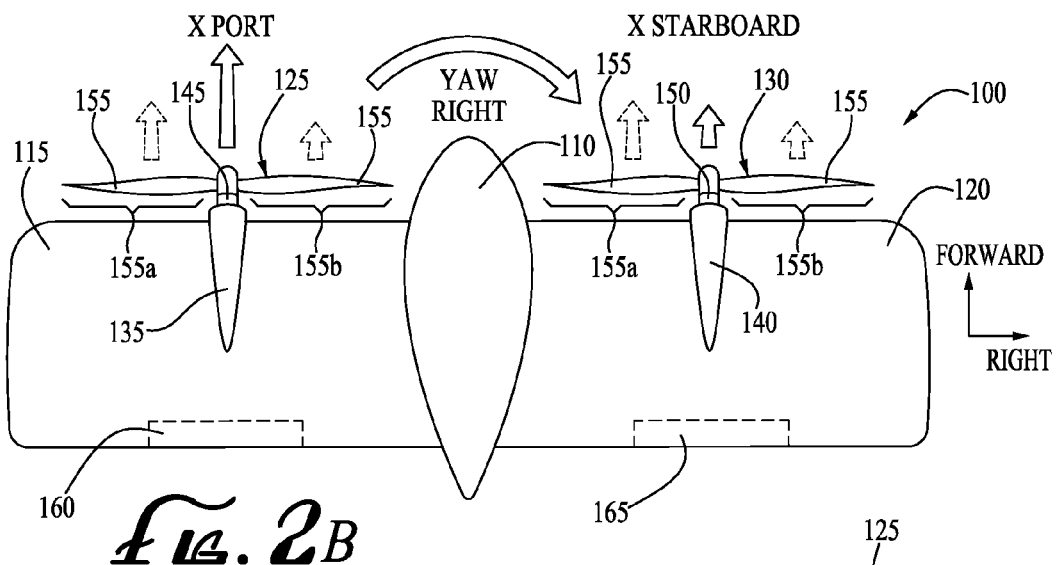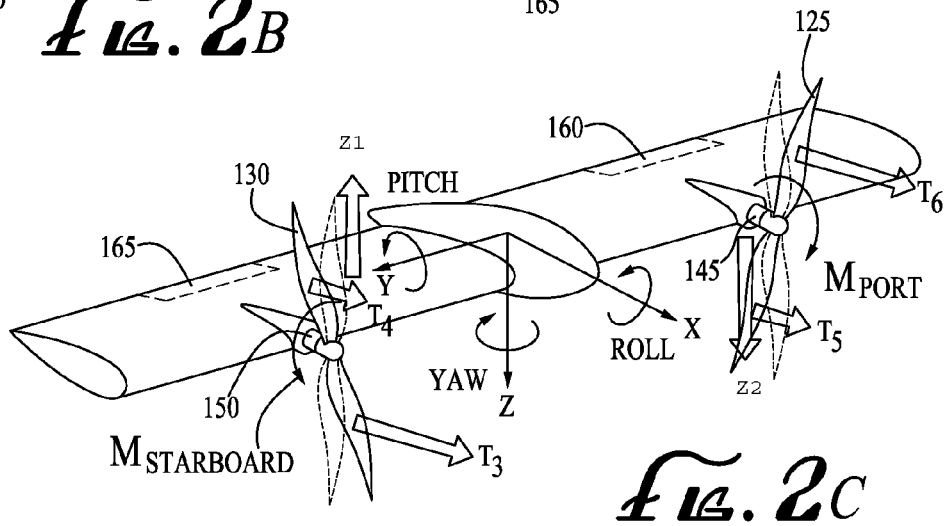

| | EFFECTOR | GRAPHIC |
|---|---|---|
| 1. | PITCH | SYMMETRIC PITCH CYCLIC (NOSE UP POSITIVE) |
| 2. | ROLL | ASYMMETRIC CYCLIC AND ELEVON (RIGHT ROLL POSITIVE) |
| 3. | YAW | ASYMMETRIC COLLECTIVE (NOSE RIGHT POSITIVE) |
| 4. | THRUST | SYMMETRIC COLLECTIVE (FORWARD POSITIVE) |

FIG. 3A

2-ROTOR AIRCRAFT CONFIGURATION EMBODIMENTS

| | | EFFECTORS - EMBODIMENT 1 | GRAPHIC |
|---|---|---|---|
| 1. | PITCH AND PITCH TO/FROM VERTICAL FLIGHT | SYMMETRIC CYCLIC - PORT AND STARBOARD | |
| 2. | ROLL | ASYMMETRIC CYCLIC - PORT VS. STARBOARD | |
| 3. | YAW | ASYMMETRIC COLLECTIVE - PORT VS. STARBOARD | |
| 4. | COORDINATED TURN | ASYMMETRIC CYCLIC - PORT VS. STARBOARD; AND ASYMMETRIC COLLECTIVE - PORT VS. STARBOARD | |
| 5. | HOVER, SLOW HORIZONTAL TRANSLATION | SYMMETRIC CYCLIC - (NON-ZERO) ALL | |

FIG. 3B

2-ROTOR AIRCRAFT CONFIGURATION EMBODIMENTS

| | | EFFECTORS - EMBODIMENT 2 | EFFECTORS - EMBODIMENT 3 | EFFECTORS - EMBODIMENT 4 |
|---|---|---|---|---|
| 1. | PITCH AND PITCH TO/FROM VERTICAL FLIGHT | SYMMETRIC CYCLIC - PORT VS. STARBOARD; AND SYMMETRIC ELEVONS - PORT AND STARBOARD | | |
| 2. | ROLL | ASYMMETRIC CYCLIC - PORT VS. STARBOARD; AND ASYMMETRIC ELEVONS - PORT VS. STARBOARD | | |
| 3. | YAW | DIFFERENTIAL MOTOR RPM - PORT VS. STARBOARD | ASYMMETRIC COLLECTIVE - PORT VS. STARBOARD; AND DIFFERENTIAL MOTOR RPM - PORT VS. STARBOARD | |
| 4. | COORDINATED TURN | ASYMMETRIC ELEVONS - PORT VS. STARBOARD; AND ASYMMETRIC COLLECTIVE - PORT VS. STARBOARD | ASYMMETRIC CYCLIC - PORT VS. STARBOARD; AND ASYMMETRIC COLLECTIVE - PORT VS. STARBOARD; AND ASYMMETRIC ELEVONS - PORT VS. STARBOARD | ASYMMETRIC CYCLIC - PORT VS. STARBOARD; AND ASYMMETRIC ELEVONS - PORT VS. STARBOARD; AND DIFFERENTIAL MOTOR RPM - PORT VS. STARBOARD |
| 5. | HOVER, SLOW HORIZONTAL TRANSLATION | SYMMETRIC CYCLIC - (NON-ZERO) ALL; AND ELEVON | ASYMMETRIC COLLECTIVE - PORT VS. STARBOARD | |

FIG. 3C

VERTICAL FLIGHT ORIENTATION
4-ROTOR AIRCRAFT FLIGHT CONTROL CONFIGURATION EMBODIMENTS - EFFECTOR CONTROL

|  |  | EFFECTORS - EMBODIMENT 1 | EFFECTORS - EMBODIMENT 2 |
|---|---|---|---|
| 1. | PITCH TO HORIZONTAL FLIGHT | DIFFERENTIAL MOTOR RPM - FORWARD PORT AND FORWARD STARBOARD VS. AFT PORT AND AFT STARBOARD | ASYMMETRIC COLLECTIVE - FORWARD PORT AND FORWARD STARBOARD VS. AFT PORT AND AFT STARBOARD |
| 2. | HOVER, SLOW HORIZONTAL TRANSLATION | SYMMETRIC CYCLIC (NON-ZERO) - ALL | ASYMMETRIC COLLECTIVE - FORWARD PORT AND FORWARD STARBOARD VS. AFT PORT AND AFT STARBOARD |
| 3. | HOVER, NON-ZERO ROLL ANGLE | ASYMMETRIC COLLECTIVE - FORWARD AND AFT STARBOARD VS. FORWARD AND AFT PORT; AND SYMMETRIC CYCLIC (NON-ZERO) - ALL | DIFFERENTIAL MOTOR RPM - FORWARD AND AFT STARBOARD VS. FORWARD AND AFT PORT; AND SYMMETRIC CYCLIC - ALL |
| 4. | HOVER, NON-ZERO PITCH ANGLE | ASYMMETRIC COLLECTIVE - FORWARD PORT AND FORWARD STARBOARD VS. AFT PORT AND AFT STARBOARD; AND SYMMETRIC CYCLIC - FORWARD AND AFT PORT, FORWARD AND AFT STARBOARD | DIFFERENTIAL MOTOR RPM - FORWARD PORT AND FORWARD STARBOARD VS. AFT PORT AND AFT STARBOARD; AND SYMMETRIC CYCLIC - FORWARD AND AFT PORT, FORWARD AND AFT STARBOARD |
| 5. | HOVER/VERTICAL ORIENTATION, YAW | ASYMMETRIC CYCLIC - FORWARD AND AFT PORT VS. FORWARD AND AFT STARBOARD | DIFFERENTIAL MOTOR RPM - FORWARD PORT AND AFT STARBOARD VS. AFT PORT AND FORWARD STARBOARD |
| 6. | VERTICAL TAKE-OFF | SYMMETRIC MOTOR RPM - ALL | SYMMETRIC COLLECTIVE - ALL |

FIG. 5

HORIZONTAL FLIGHT ORIENTATION
4-ROTOR AIRCRAFT CONTROL CONFIGURATION EMBODIMENTS - EFFECTOR CONTROL

| | AIRCRAFT MOTION | EFFECTORS - EMBODIMENT 1 | EFFECTORS - EMBODIMENT 2 | EFFECTORS - EMBODIMENT 3 |
|---|---|---|---|---|
| 1. | PITCH TO VERTICAL FLIGHT | ELEVATOR AND ASYMMETRIC COLLECTIVE - FORWARD PORT AND FORWARD STARBOARD VS. AFT PORT AND AFT STARBOARD | ASYMMETRIC COLLECTIVE - FORWARD PORT AND FORWARD STARBOARD VS. AFT PORT AND AFT STARBOARD | DIFFERENTIAL MOTOR RPM - FORWARD PORT AND FORWARD STARBOARD VS. AFT PORT AND AFT STARBOARD |
| 2. | PITCH | ELEVATOR | ASYMMETRIC COLLECTIVE - FORWARD PORT AND FORWARD STARBOARD VS. AFT PORT AND AFT STARBOARD | DIFFERENTIAL MOTOR RPM - FORWARD PORT AND FORWARD STARBOARD VS. AFT PORT AND AFT STARBOARD |
| 3. | ROLL | AILERONS - FORWARD PORT AND FORWARD STARBOARD | ASYMMETRIC CYLIC - FORWARD PORT AND AFT PORT VS. FORWARD STARBOARD AND AFT STARBOARD | DIFFERENTIAL MOTOR RPM - FORWARD PORT AND AFT PORT VS. FORWARD STARBOARD AND AFT STARBOARD |
| 4. | YAW | ASYMMETRIC COLLECTIVE - FORWARD AND AFT PORT VS. FORWARD AND AFT STARBOARD | ASYMMETRIC COLLECTIVE - FORWARD AND AFT PORT VS. FORWARD AND AFT STARBOARD | DIFFERENTIAL MOTOR RPM - FORWARD AND AFT PORT VS. FORWARD AND AFT STARBOARD |
| 5. | COORDINATED TURN | AILERONS - FORWARD PORT AND FORWARD AFT ASYMMETRIC COLLECTIVE - FORWARD AND AFT PORT VS. FORWARD AND AFT STARBOARD | ASYMMETRIC CYLIC - FORWARD PORT AND AFT PORT VS. FORWARD STARBOARD AND AFT STARBOARD ASYMMETRIC COLLECTIVE - FORWARD AND AFT PORT VS. FORWARD AND AFT STARBOARD | DIFFERENTIAL MOTOR RPM - FORWARD PORT AND AFT PORT VS. FORWARD STARBOARD AND AFT STARBOARD DIFFERENTIAL MOTOR RPM - FORWARD AND AFT PORT VS. FORWARD AND AFT STARBOARD |

Fig. 6

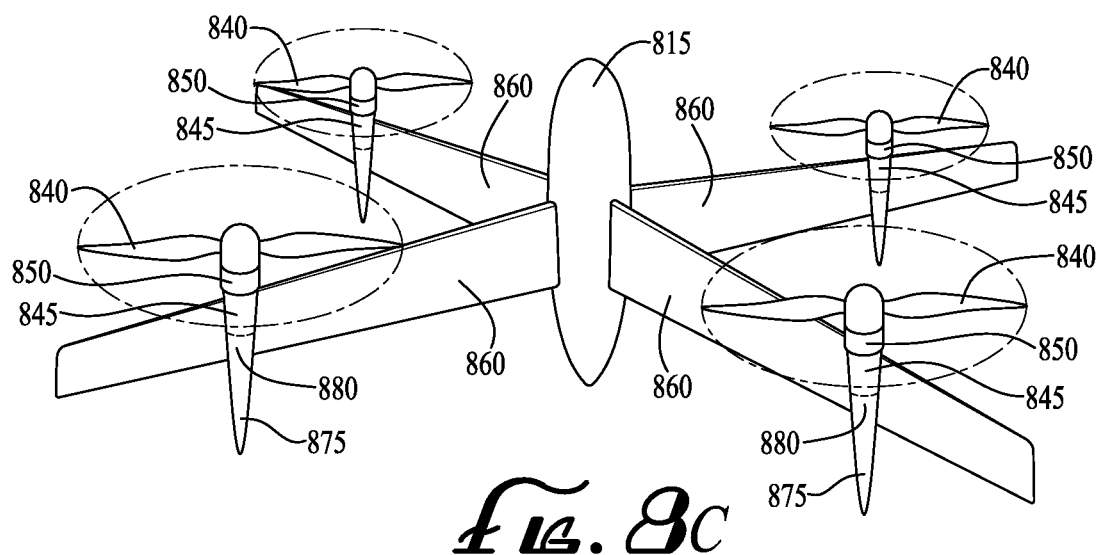

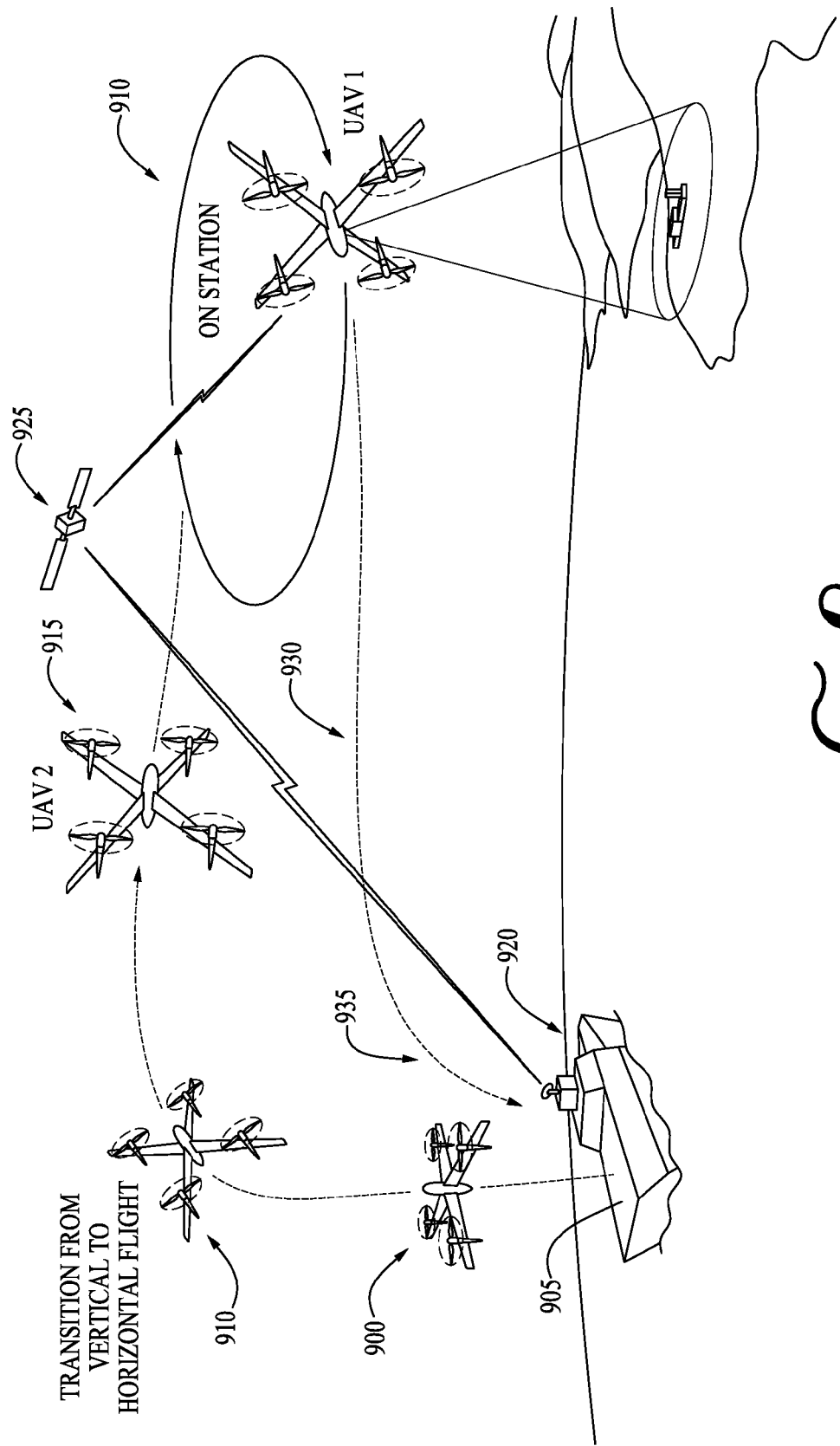

VERTICAL TAKEOFF AND LANDING (VTOL) AIR VEHICLE

CROSS REFERENCE TO RELATED APPLICATIONS

This application is a continuation of International Application No. PCT/US14/36863 filed May 5, 2014, which claims priority to and the benefit of U.S. Provisional Application No. 61/819,487 filed May 3, 2013, the disclosures of both of which are incorporated by reference herein for all purposes.

FIELD OF THE INVENTION

The field of the invention relates to aircraft flight control, and more particularly to aircraft flight control of rotary fixed-wing aircraft.

DESCRIPTION OF THE RELATED ART

Many applications exist for remotely or autonomously-piloted unmanned aerial vehicles (UAVs) that are able to take off, loiter, and land without the benefit of a runway. Vertical takeoff and landing (VTOL) vehicles address this limitation and may come in the form of hand-launched aerial vehicles having a main wing and a vertical/horizontal tail control surfaces, or three or four-rotor copters that are operable to take off and land vertically. Aerial vehicles having a main wing and vertical/horizontal tail control surfaces tend to be more efficient and faster in cruise, while rotor copters are less efficient in forward flight but have takeoff and landing advantageous.

A need continues to exist to design and manufacturer aerial vehicles that are efficient in flight and that can takeoff and land vertically.

SUMMARY

A flight control apparatus is disclosed for fixed-wing aircraft that includes a first port wing and a first starboard wing, a first port swash plate coupled between a first port rotor and a first port electric motor, the first port electric motor coupled to the first port wing, and a first starboard swash plate coupled between a first starboard rotor and a first starboard electric motor, the first starboard electric motor coupled to the first starboard wing. The apparatus may also include a second port wing and second starboard wing, a second port swash plate coupled between a second port rotor and second port electric motor, the second port electric motor coupled to the second port wing, and a second starboard swash plate coupled between a second starboard rotor and second starboard electric motor, the second starboard electric motor coupled to the second starboard wing. In one embodiment, the apparatus may include a horizontal stabilizer coupled to a fuselage and an elevator rotatably coupled to the horizontal stabilizer, the fuselage coupled between the first port wing and second starboard wing, and may include a port aileron rotatably disposed on a trailing edge of the first port wing and a starboard aileron rotatably disposed on a trailing edge of the first starboard wing. The apparatus may include first and second landing gear attached to the first port wing and first starboard wing, respectively, and may include a third landing gear attached to the horizontal stabilizer.

A method of flight control for fixed-wing aircraft is also disclosed that includes inducing a right roll of a fuselage coupled between a first port wing and a first starboard wing, in response to i) generating in a first port rotor a positive rotational moment in response to actuation of a first port swash plate, the first port rotor rotatably coupled to the first port wing, and ii) generating in a first starboard rotor a negative rotational moment in response to actuation of a first starboard swash plate, the first starboard rotor rotatably coupled to the first starboard wing. In some embodiments, the method may include generating asymmetric collective control between the first port rotor and the first starboard rotor to induce a yaw moment about the fuselage. When used together, the asymmetric collective control, positive rotational moment and negative rotational moment can enable a coordinated turn of the port and starboard wings. In one embodiment, the method may also include inducing a left roll of a fuselage in response to generating in the first port rotor a negative rotational moment in response to actuation of the first port swash plate and generating in the starboard rotor a positive rotational moment in response to actuation of the first starboard swash plate. The method may also include providing pitch control of the fuselage in response to asymmetric collective control provided between at least the first port rotor and a second port rotor rotatably coupled to a second port wing, the second port wing coupled to the fuselage. In one embodiment, the method may include providing pitch control of the fuselage in response to providing differential angular velocities (RPM) between at least the first port rotor and a second port rotor rotatably coupled to a second port wing, the second port wing coupled to the fuselage, and may include providing pitch control of the fuselage in response to providing differential angular velocities (RPM) between the first starboard rotor and a second starboard rotor rotatably coupled to a second starboard wing. Further embodiments may include providing elevator control complementary to the providing pitch control to supplement the pitching moment with an additional pitching moment. In one embodiment, the method may include providing pitch control of the fuselage in response to actuating an elevator. Right roll of the fuselage may be induced in response to generating in a second port rotor a positive rotational moment in response to actuation of a second port swash plate, the second port rotor rotatably coupled to a second port wing, and generating in a second starboard rotor a negative rotational moment in response to actuation of a second starboard swash plate, the second starboard rotor rotatably coupled to a second starboard wing so that the positive and negative moments of force generated in the second port rotor and second starboard rotor induce a right roll of the second port and second starboard wings. The method may also include supplementing the right roll of the fuselage in response to actuating port and starboard ailerons rotatably coupled to the second port wing and second starboard wing, respectively.

A further method of vertical take-off and horizontal flight of a fixed-wing aircraft, is disclosed that generating thrust in a first port rotor driven by a first port electric motor on a first port wing and a first starboard rotor driven by a first starboard motor on a first starboard wing to induce vertical takeoff of a fuselage coupled between the first port wing and a first starboard wing. In this disclosed method, the method may also include generating a negative rotational moment in the first port rotor and first starboard rotor using cyclic rotor blade control to accomplish transition of the first port and first starboard wings from vertical takeoff to horizontal flight, and may include generating thrust in a second port rotor driven by a second port electric motor on a second port wing and a second starboard rotor driven by a second starboard motor on a second starboard wing. The fuselage may be transitioned from vertical takeoff to horizontal flight in a number of disclosed embodiments, including i) in response to asymmetric collective control as between the first port rotor and first starboard rotor on the one hand and the second port rotor and the second starboard rotor on the other hand, and ii) in response to differential rotor angular velocity control (RPM) control as between the first port rotor and first starboard rotor on the one hand and the second port rotor and the second starboard rotor on the other. Horizontal thrust may be provided in response to generating symmetric cyclic control of the first port rotor, first starboard rotor, second port rotor, and second starboard rotor or in response to generating differential thrust of at least one pair of rotors selected from the group consisting of: i) first and second port rotors on the one hand and first and second starboard rotors on the other hand, ii) first port rotor and first starboard rotor on the one hand and second port rotor and second starboard rotor on the other hand. In one embodiment, pitch and roll station-keeping control of the fuselage may be provided in response to generating symmetric cyclic control of the first port rotor, first starboard rotor, second port rotor, and second starboard rotor to provide horizontal thrust and generating differential thrust of at least one pair of rotors selected from the group consisting of: i) first and second port rotors on the one hand and first and second starboard rotors on the other hand, ii) first port rotor and first starboard rotor on the one hand and second port rotor and second starboard rotor on the other hand so that generating differential thrust in combination with the generating symmetric cyclic control induces the fuselage to remain stationary and at a pitch or roll angle with respect to horizontal.

A further method of fixed-wing aircraft control includes providing rotor blade pitch control to a first port rotor coupled to a first port wing, the rotor blade pitch control for the first port rotor selected from the group consisting of longitudinal cyclic control, lateral cyclic control and collective pitch control to induce pitch, roll and yaw moments, respectively; and providing rotor blade pitch control to a first starboard rotor coupled to a first starboard wing, the rotor blade pitch control for the first starboard rotor selected from the group consisting of longitudinal cyclic control, lateral cyclic control and collective pitch control to induce pitch, roll and yaw moments, respectively. Through such a method, the fixed-wing aircraft pitch, yaw and roll moments may be accomplished without the benefit of control surfaces on a wing. In another embodiment, the method may also include providing rotor blade pitch control to a second port rotor coupled to a second port wing, the rotor blade pitch control selected from the group consisting of longitudinal cyclic control, lateral cyclic control and collective pitch control; and providing rotor blade pitch control to a second starboard rotor coupled to a second starboard wing, the cyclic control selected from the group consisting of longitudinal cyclic control, lateral cyclic control and collective pitch control.

A fixed-wing aircraft is also disclosed that may include a fuselage, a first port wing and a first starboard wing extending from opposite sides of the fuselage, the first port wing and first starboard wing lacking in-flight controllable surfaces; a first port rotor coupled to the first port wing, the first port rotor driven by a first electric motor and having a first swash plate; and a first starboard rotor coupled to the first starboard wing; the first starboard rotor driven by a second electric motor and having a second swash plate. In one embodiment of this aircraft, the first and second swash plates may enable first port rotor blade pitch control and first starboard rotor blade pitch control, each independently, and selected from the group consisting of longitudinal cyclic control, lateral cyclic control and collective pitch control. The aircraft may also include a second port wing and second starboard wing extending from opposite sides of the fuselage, a second port rotor coupled to the second port wing, the second port rotor driven by a third electric motor and having a third swash plate, and a second starboard rotor coupled to the second starboard wing, the second starboard rotor driven by a fourth electric motor having a fourth swash plate.

BRIEF DESCRIPTION OF THE DRAWINGS

The components in the figures are not necessarily to scale, emphasis instead being placed upon illustrating the principals of the invention. Like reference numerals designate corresponding parts throughout the different views.

FIGS. 2A, 2B, and 2C are starboard plan, top and perspective views, respectively, of the two-rotor fixed wing aircraft first illustrated in FIG. 1 and further illustrating pitch up, yaw right and rolling flight control inputs, respectively;

FIG. 3A is a table illustrating pitch, roll, yaw and thrust effector inputs and associated graphical representations of the two-rotor fixed wing aircraft illustrated in FIGS. 1 and 2;

FIG. 3B is a table describing embodiments of effector control for the two-rotor fixed-wing aircraft illustrated in FIGS. 1, 2A, 2B, and 2C;

FIG. 3C is another table describing embodiments of effector control for the two-rotor fixed-wing aircraft illustrated in FIGS. 1, 2A, 2B, and 2C;

FIG. 5 is a table describing embodiments of a vertical flight orientation mode and associated control effectors for the four-rotor fixed-wing aircraft illustrated in FIGS. 4A, 4B, and 4C;

FIG. 6 is a table describing embodiments of a horizontal flight orientation mode and associated control effectors for the four-rotor fixed-wing aircraft illustrated in FIGS. 4A, 4B, and 4C;

FIGS. 8A, 8B, 8C are top plan, front plan and perspective views, respectively, of another embodiment of a four-rotor fixed-wing aircraft;

FIG. 9 is one embodiment of a system for use with a four-rotor or two-rotor (not illustrated) fixed-wing aircraft operable for shipboard launch and on station loiter over land using satellite communications.

DETAILED DESCRIPTION

Figure 1:
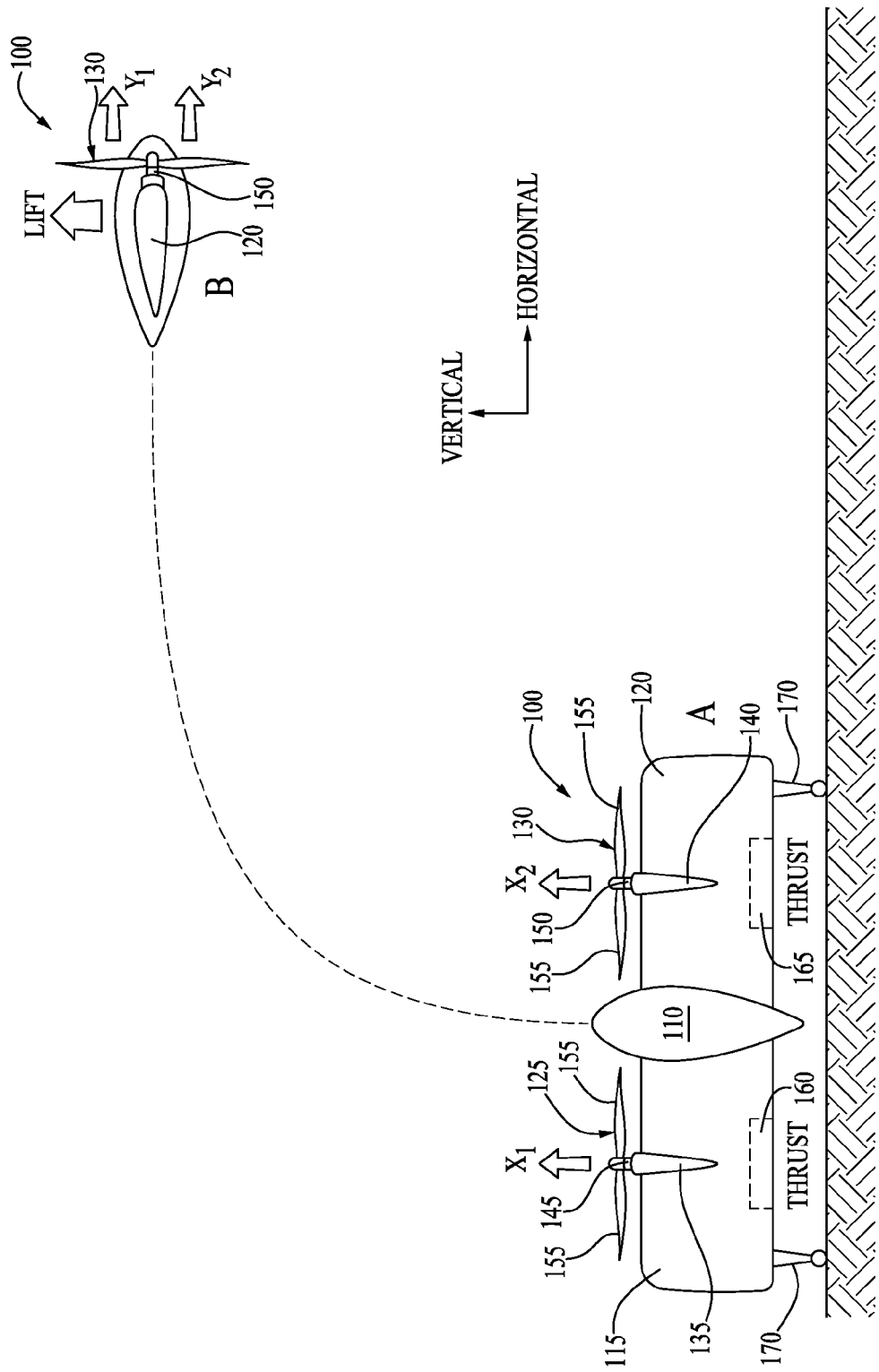
FIG. 1 illustrates one embodiment of a two-rotor fixed wing aircraft transitioning from vertical takeoff to horizontal flight.

A vertical take-off and landing (VTOL) air vehicle is disclosed with one or more wings that can take off and land vertically using a two or more rotors that are operable to lift the air vehicle vertically upwards, transition the air vehicle to horizontal flight, and then transition it back to vertical flight to land the air vehicle vertically downwards. During vertical flight, the wing(s) may be orientated vertically and so not contribute vertical lift while the vehicle is moving up or down (e.g., the wings are pointed upwards). When airborne, the air vehicle can translate horizontally while maintaining in its vertical orientation, at least substantially (e.g., sliding from side-to-side), and may transition to forward flight by using its rotors to rotate the air vehicle from an at least generally vertical to an at least generally horizontal orientation and then back to an at least generally vertical flight from an at least generally horizontal flight for landing. In forward flight, the one or more wings generate lift and the rotors are directed to propel the vehicle generally forward. In this manner, the air vehicle can utilize the efficiency of lift generated by a wing while in forward flight to maximize endurance, but does not require a lengthy horizontal runway to take off and land given the capability to take off and land vertically.

In embodiments, attitudinal control for the vehicle comes entirely from the means of propulsion without the benefit of aerodynamic control surfaces, such as ailerons, an elevator, or rudder. Without control surfaces on the structure of the vehicle (which typically are placed at the trailing edges of the wing or stabilizer), the vehicle is lighter, more efficient (aerodynamic), more reliable, less complex and generally more rugged. Being more rugged allows the air vehicle to be subjected to physical conditions and handling that a vehicle with control surfaces would not typically or otherwise be subject to without damage or potential adverse effects on its control and operation. For example, an air vehicle without control surfaces on its structure could land vertically into bushes or rocky terrain without potential for later flight control problems due to damaged flight control surfaces. Likewise, without control surfaces the air vehicle requires less maintenance and is less susceptible to being damaged in handling, such as when being moved about on board a ship. Without control surfaces on the air vehicle, drag is reduced. In other embodiments, some control surfaces may be provided to supplement attitudinal control that is otherwise provided by the means of propulsion.

In embodiments, the means for propulsion is at least two rotors rotatably attached to a wing through respective electric motors and each including a swash plate that can provide pitch, yaw and roll control of the air vehicle by varying blade rotation rate (rpm) and/or blade pitch, such as with either/or cyclic or collective pitch control. In vertical flight (or at least generally vertical) a majority of the lift, attitudinal control, and propulsion may be generated by the at least two propellers; and in horizontal flight (or at least generally horizontal) the majority of lift may be generated by the wing surfaces, and vehicle attitudinal control and propulsion may be generated by the at least two rotors. That is, for horizontal flight, the air vehicle's pitch, yaw, and roll control would be provided through the differential thrust and rotational moments created by the at least two rotors, each rotor consisting of at least two or three rotatable rotor blades having controllably variable pitch through the use of, for example, a swash plate having two or three axes of control. In embodiments, aerodynamic control surfaces, such as an elevator and ailerons, may be provided to supplement attitudinal control in vertical and horizontal flight.

FIG. 1 shows an embodiment of a two-rotor fixed wing air vehicle 100 that may have a fuselage 110 coupled between port and starboard wings (115, 120), and including port and starboard rotors (125, 130). The port and starboard rotors (125, 130) are coupled to and driven by respective port and starboard electronic motors (135, 140) through respective port and starboard swash plates (145, 150) that provide collective control and, preferably, single-axis cyclic pitch control of the rotor blades 155. In another embodiment, the swash plates (135, 150) may provide for collective control and two-axis cyclic pitch control of the rotor blades 155. In a further embodiment, the port and starboard wings (115, 120) have port and starboard elevons (160, 165) spanning approximately the rotor wash behind the port and starboard rotors (125, 130), respectively, to supplemental pitch and/or roll attitudinal control of the aircraft 100. For example, if supplementary pitch control is desired, such as for use in the transition between vertical flight and horizontal flight, the elevons (160, 165) would be actuated in a "flap-down" configuration to induce a pitch-forward moment in the aircraft. Similarly, if supplementary roll control is desired, the elevons (160, 165) may be operated as ailerons would be on a conventional wing and vertical/horizontal stabilizers aircraft. For forward and backwards transitioning of the air vehicle during vertical flight, the elevons (160, 165) may be used to maintain (at least generally) the vertical orientation of the air vehicle by generating a moment counteracting the lift generated by the wing with the airflow over it from the prop wash.

The aircraft is illustrated as disposed initially on the ground on its landing gear 170 and oriented in a vertical position at landed position A. Vertical take-off of the aircraft 100 is accomplished as vertical thrust is supplied by the first port rotor 125 and first starboard rotor 130, as driven by the first port electric motor and the first starboard motor, respectively (135, 140). The rotors (125, 130) are operable to develop symmetric or differential thrust (X1, X2) using angular velocity control or collective control inputs, and symmetric or differential rotational moments using cyclic control inputs, to collectively enable pitch, roll, yaw and vertical/horizontal acceleration. For purposes of this application, the inertial frame of reference is provided in FIG. 2C and vertical/horizontal directions provided in FIG. 1.

The air vehicle may transition from the landed position (position A) to vertical flight and then to horizontal flight (position B) where a majority of lift is provided by the wings (115, 120). Attitudinal control (pitch, roll, yaw) may be provided during both vertical flight and horizontal flight by the rotors (125, 130) as respective pitches of the rotor blades 155 are guided by the swash plates (145, 150) and as the rotors (125, 130) are rotationally driven by the electric motors (135, 140). Horizontal thrust ($Y_1$, $Y_2$) during horizontal flight is sufficient to overcome parasitic and induced drag of the wings (115, 120) and fuselage 110 during cruise, loitering and further horizontal configuration ascent.

FIGS. 2A, 2B, and 2C are starboard plan, top and perspective views, respectively, illustrating pitch up, yaw right and roll flight control forces, respectively, of the two-rotor aircraft. As shown in the side view of FIG. 2A, with the air vehicle 100 in forward flight, a greater thrust T1 may be created below the center of the rotor(s) and thus below the center of mass M of the air vehicle 100 than the thrust T2 produced above the center of the rotor(s) and the center of mass M of the air vehicle 100 using cyclic control of the rotors (125, 130) by means of swash plates (145, 150). In some embodiments the hub and/or rotor blades can be hinged or gimbaled so that as the swash plate (145, 150) moves the rotor will displace at an angle relative to its initial position (or to the air vehicle), associated with the swash plate displacement, resulting in the thrust vector being angled relative to its initial position (e.g., directly forward), where a component of this angled force vector will impart a force on the air vehicle to cause it to rotate (e.g., pitch). The differential forces created and resulting rotational moments will cause the air vehicle 100 to pitch up, if negative rotational moments are created from the cyclic control inputs, or pitch down, if positive rotational moments are created from the cyclic control inputs. Similarly, a right roll of the fuselage 110 may be induced if the port rotor 125 generates a positive rotational moment in response to actuation of the port swash plate 145 and the starboard rotor 130 generates a negative rotational moment in response to actuation of the starboard swash plate 150.

In FIG. 2B, the air vehicle is illustrated during forward flight in its horizontal flight orientation, with yaw control affected by differential thrust (XPORT, XSTARBOARD) of the port and starboard rotors (125, 130). In its horizontal flight orientation, differential thrust (XPORT, XSTARBOARD) of the rotors (125, 130) may be accomplished through asymmetric collective control provided by the port and starboard swash plates (145, 150) and/or, in a non-preferred embodiment, by differential motor angular rate control (rotor RPM) of the port and starboard rotors (125, 130) using control of the port and starboard electric motors (135, 140). For example, a right-hand yaw moment (yaw to the starboard side) may be induced by i) increasing thrust generated by the port rotor 125, ii) decreasing thrust generated by the starboard rotor 130, or by iii) both increasing thrust generated by the port rotor 125 and decreasing thrust generated by the starboard rotor 130. Increased thrust generated by a particular rotor may be accomplished by increasing pitch angles of associated rotor blades 155 through collective actuation or, in a non-preferred embodiment, by increasing angular rotation (RPM) of the particular rotor as driven by the associated electric motor. Similarly, decreased thrust generated by a particular rotor may be accomplished by decreasing pitch angles of associated rotor blades 155 through collective actuation or by decreasing angular rotation (RPM) of the particular rotor as driven by the associated electric motor.

In an alternative embodiment, symmetric cyclic control may be provided by the port rotor 125 and starboard rotor 130 to produce asymmetric left and right positioned blade thrusts (illustrated with dashed lines) to produce a net yaw right of moment. More particularly, port swash plate 145 actuates asymmetric blade pitch in the port rotor 125 such that blades passing left (region 155a) of the port rotor 125 generate greater thrust than blades passing right (region 155b) of the port rotor 125. Similarly, blades passing left (region 155a) of the starboard rotor 130 generate greater thrust than blades passing right (region 155b) of the starboard rotor 130, with all blades collectively generating a net yaw right of the fuselage 110 through the port and starboard wings (115, 120).

FIG. 2C is a perspective view illustrating cyclic control of the rotors producing left roll of the fuselage. In one embodiment, the left roll of the fuselage is induced in response to generating in the first port rotor 125 a negative rotational moment $M_{PORT}$ in response to actuation of the first port swash plate 145 and generating in the first starboard rotor 130 a positive rotational moment $M_{STARBOARD}$ in response to actuation of the first starboard swash plate 150. Similarly, to affect a right roll on the fuselage, a positive rotational moment may be generated in the first port rotor in response to actuation of the first port wash plate and a negative rotational moment in the starboard rotor in response to actuation of the first starboard swash plate. The up pitch on the right wing and the down pitch on the left wing causes the air vehicle 100 to roll to the left (as viewed from behind). Similarly, reversing these pitch forces may induce the air vehicle 100 to roll to the right. Also illustrated in FIG. 2C are horizontal thrust components T3, T4, T5, and T6 and indicate thrust magnitudes of associated blades 155 at the illustrated rotor blade positions, along with associated vertical thrust vector components $Z_1$ (starboard wing), $Z_2$ (port wing).

FIG. 3A describes embodiments of pitch, roll, yaw and thrust effector inputs along with associated force vectors and graphical representations of the two-rotor fixed wing aircraft illustrated in FIGS. 1 and 2. In row 1 of FIG. 3A, a front plan view of the aircraft 100 is provided to illustrate one embodiment of nose up positive pitch control of the fuselage 110 through the port and starboard wings (115, 120). Pitch up may be induced using symmetric pitch cyclic control, such as by generating in the port and starboard rotors (125, 130) respective positive (and equal) rotational moments in response to actuation of port and starboard swash plates, respectively, that results in a pitch up force as indicated with two vertical force lines. Left plan and right plan views of the air vehicle 100 are also provided illustrating a net nose up force vector generated from the nose up symmetric pitch cyclic control.

In row 2 of FIG. 3A, a front plan view of the aircraft 100 is provided to illustrate a right (positive) roll of the fuselage. The right (positive) roll may be induced using asymmetric cyclic control of the port and starboard rotors (125, 130), such as by generating in the port rotor 125 a positive rotational moment in response to suitable actuation of the port swash plate and generating in the starboard rotor a negative rotational moment in response to suitable actuation of the starboard swash plate. Although not illustrated in FIG. 3A, a left roll of the fuselage may also be provided using asymmetric cyclic control of port and starboard rotors (125, 130). For example, a negative rotational moment may be generated in the port rotor in response to suitable actuation of the port swash plate, and a positive rotational moment generated in the starboard rotor in response to suitable actuation of the starboard swash plate, resulting in the left roll of the fuselage 110. Asymmetric control of elevons may also supplement left roll of the fuselage (see FIG. 2B), such as by extending the port elevon 160 up to reduce lift on the port wing 115 and extending the starboard elevon 165 down to increase lift on the starboard wing 165.

In row 3 of FIG. 3A, a top plan view of the aircraft 100 is provided to illustrate right (positive) yaw of the fuselage. The yaw may be induced using differential thrust of the port and starboard rotors (125, 130). Such differential thrust may be provided by either asymmetric collective control or differential rotational speed control of the port and starboard rotors (125, 130). As illustrated in line 3 of FIG. 3A, nose right yaw (positive) may be induced about the fuselage by the port rotor 125 providing more thrust than the starboard rotor 130. Similarly, nose left yaw (negative) may be induced about the fuselage by the port rotor 125 providing less thrust than the collective rotor 130. In one embodiment, differential thrust is provided using differential rates of rotation of the port and starboard rotors (125, 130), such as would be provided by port and starboard electric motors (135, 140) driving the port and starboard rotors (125, 130) at different revolutions-per-minute (RPMs). In another embodiment described in FIG. 3A, asymmetric collective control of the rotors (125, 130) are used to provide differential thrust, such as by providing greater relative collective control of the port rotor 125 and less relative collective control of the starboard rotor 130.

In row 4 of FIG. 3A, a top plan view of the aircraft 100 is also provided to illustrate one embodiment of application of thrust. In one embodiment, thrust adjustments may be made using symmetric collective (forward positive) control of the rotors (125, 130). The rotors (125, 130) may be driven at a constant angular rotation rate by port and starboard electric motors (135, 140), with rotor thrust varied by collective blade pitch adjustments made by respective port and starboard swash plates (145, 150). In order to increase forward thrust, the port and starboard swash plates (145, 150) may increase respective collective control inputs to increase the pitch of each blade 155 in a symmetric manner. In order to decrease forward thrust, the port and starboard swash plates (145, 150) may decrease respective collective control inputs to decrease the pitch of each blade 155 in a symmetric manner.

FIGS. 3B and 3C are tables describing different flight control effector embodiments available to accomplish pitch in horizontal or vertical flight, roll, yaw, and coordinated turns for the two-rotor fixed-wing aircraft illustrated in FIGS. 1, 2A, 2B, and 2C, along with associated graphics illustrating associated forces. Pitch and pitch to/from vertical flight control may be accomplished by means of at least two effector embodiments. In Embodiment 1 (line 1), symmetric cyclic control inputs may be provided as between the port and starboard rotors (125, 130). For example, pitch-up control of the fuselage 110 may be induced in response to generating a positive rotational moment in each of the port and starboard rotors (125, 130) (i.e., symmetric cyclic rotor control) in response to suitable symmetric actuation of respective port and starboard swash plates (145, 150). Similarly, pitch down control of the fuselage 110 may be induced in response to generating a negative rotational moment in each of the port and starboard rotors (125, 130) in response to suitable symmetric actuation of respective port and starboard swash plates (145, 150). In Embodiment 2 of pitch and pitch to/from vertical flight control illustrated in FIG. 3C, such pitch effector control may be supplemented using symmetric actuation of port and starboard elevons (160, 165). For example, if port and starboard rotors (125, 130) are inducing pitch up of the fuselage 110, the port and starboard elevons may be actuated symmetrically (i.e., substantially similar effector control inputs) to provide additional fuselage pitch-up force.

Roll control may be accomplished in at least two different effector control embodiments. In Embodiment 1 illustrated in FIG. 3B (line 2), asymmetric cyclic control of the port and starboard rotors (125, 130) may induce a roll of the fuselage. For example, a left roll of the fuselage 110 may be induced by generating negative and positive rotational moments in port and starboard rotors (125, 130), respectively, in response to actuation of port and starboard swash plates (145, 150), respectively. Similarly, a right roll of the fuselage may be induced by generating positive and negative rotational moments in port and starboard rotors (125, 130) respectively, in response to actuation of the port and starboard swash plates (145, 150), respectively. In Embodiment 2 of the aircraft's roll effector control illustrated in FIG. 3C, the asymmetric cyclic control of the port and starboard rotors (125, 130) may be supplemented by complementary asymmetric actuation of the port and starboard elevons (160, 165). For example, if port and starboard rotors (125, 130) are inducing a left roll, then the port and starboard elevons (160, 165) may be actuated asymmetrically to provide additional fuselage left roll force, similar in operation to aileron control in aircraft having more typical aileron and fin/elevator control surfaces.

Yaw control may be accomplished with at least three different effector control embodiments. In Embodiment 1 described in FIG. 3B (line 3), a yaw moment may be induced about the fuselage 110 in response to generating asymmetric collective control (alternatively referred to as "asymmetric collective" control) between the port and starboard rotors (125, 130). For example, a right (positive) yaw may be induced by increasing relative collective control of the port rotor 125 and/or decreasing relative collective control of the starboard rotor 130 assuming straight and steady-state initial flight attitude. Similarly, a left (negative) yaw may be induced about the fuselage 110 by decreasing relative collective control of the port rotor 125 and/or increasing relative collective control of the starboard rotor 130.

In Embodiment 2 (line 3) illustrate in FIG. 3C, yaw control may be accomplished using differential motor RPM control of the port and starboard electric motors (135, 140) driving respective port and starboard rotors (125, 130). For example, a right (positive) yaw may be induced about the fuselage 110 by increasing the RPM of port rotor 125, by means of a proportional increase in the RPM of the port electric motor 135, and/or decreasing the RPM of the starboard rotor 130 by means of a proportional decrease in the RPM of the starboard electric motor 140. Similarly, a left (negative) yaw may be induced about the fuselage 110 by and decreasing the RPM of the port rotor 125 by means of a proportional decrease in the RPM of the port electric motor 135, and/or increasing the RPM of the starboard rotor 130 by means of a proportional increase in the RPM of the starboard electric motor 140.

In Embodiment 3 (line 3) illustrated in FIG. 3C, yaw control may be accomplished using asymmetric collective control of the port and starboard rotors (125, 130) with differential motor RPM control of the port and starboard electric motors (135, 140). For example, a right (positive) yaw may be induced in the fuselage 110 by increasing collective control of the port rotor 125 and/or decreasing relative collective control of the starboard rotor 130 in association with increased motor RPM control of the port electric motor 135 and/or decreased motor RPM control of the starboard electric motor 140. Similarly, a left (negative) yaw may be induced in the fuselage 110 by decreasing collective control of the port rotor on 25 and/or increasing relative collective control of the starboard rotor 130 in association with decreased motor RPM control of the port electric motor 135 and/or increased motor RPM control of the starboard electric motor 140.

FIGS. 3B and 3C also describes at least four different effector control embodiments that may be used to accomplish coordinated turns using the inventive system described herein. In Embodiment 1 described in FIG. 3B (line 4), a coordinated turn of the port and starboard wings may be accomplished by using asymmetric cyclic control of port and starboard rotors (125, 130) approximately concurrently with asymmetric collective control of the port and starboard rotors (125, 130). For example, to accomplish a coordinated right turn, asymmetric cyclic control of port and starboard rotors (125, 130) may be accomplished by generating in the port rotor 125 a positive rotational moment and generating in the starboard rotor 130 a negative rotational moment, each approximately concurrently with increasing collective control of the port rotor 125 and/or decreasing collective control of the starboard rotor 130. In another example, to accomplish a coordinated left turn, asymmetric cyclic control of port and starboard rotors (125, 130) may be accomplished by generating in the port rotor 125 a negative rotational moment and generating in the starboard rotor 130 a positive rotational moment, each approximately concurrently with decreasing collective control of the port rotor 125 and/or increasing collective control of the starboard rotor 130.

In Embodiment 2 (line 4) illustrated in FIG. 3C, the coordinated turn may be accomplished by using asymmetric port and starboard elevons (160, 165) and approximately concurrent asymmetric collective control of port and starboard rotors (125, 130). For example, to accomplish a coordinated right turn, port elevon 160 may be actuated to induce increased lift in the port wing 115 and starboard elevon 165 actuated to induce decreased lift in the starboard wing 120 each approximately concurrently with increased collective control of the port rotor 125 and/or decreased relative collective control of the starboard rotor 130. Similarly, to accomplish a coordinated left turn, port elevon 160 may be actuated to induce decreased lift in the port wing 115 and starboard elevon 165 actuated to induce increased left in the starboard wing 120, each approximately concurrently with decreased collective control of the port rotor 125 and/or increased relative collective control of the starboard rotor 130.

In Embodiment 3 (line 4) illustrated in FIG. 3C, the coordinated turn may be accomplished by using i) asymmetric cyclic control of the port and starboard rotors (125, 130) with approximately concurrent ii) asymmetric collective control of the port and starboard rotors (125, 130) and iii) asymmetric control of port and starboard elevons (160, 165). For example, a coordinated right turn may be accomplished in accordance with the right turn described above for Embodiment 2, and with the additional asymmetric cyclic control of port and starboard rotors (125, 130) such as by generating in the port and starboard rotors (125, 130) positive and negative rotational moments, respectively, in response to actuation of the port and starboard swash plates (145, 150), respectively. Similarly, a coordinated left turn may be accomplished in accordance with the left turn described above for and Embodiment 2, and with the additional asymmetric cyclic control of port and starboard rotors (125, 130) such as by generating in the port and starboard rotors (125, 130) negative and positive rotational moments, respectively in response to actuation of the port and starboard swash plates (145, 150), respectively.

In Embodiment 4 (line 4) of FIG. 3C, the coordinated control may be accomplished by using i) asymmetric cyclic control of the port and starboard rotors (125, 130) with approximately concurrent ii) asymmetric actuation of the port and starboard elevons (160, 165); and with iii) differential motor RPM control of the port and starboard electric motors (135, 140).

FIGS. 3B and 3C also describe at least three different effector control embodiments that may be used to accomplish a slow horizontal translation using the inventive system described herein. In Embodiment 1 (line 5), the slow horizontal translation may be accomplished by using symmetric cyclic (non-zero) rotor control of port and starboard rotors. In Embodiment 2 (line 5) illustrated in FIG. 3C, the slow horizontal translation may be accomplished using i) symmetric cyclical (non-zero) rotor control of all rotors, and ii) elevon control maintain a more vertical orientation of the aircraft. In Embodiment 3 (line 5) illustrated in FIG. 3C, horizontal translation may be accomplished using asymmetric collective control of the port rotor vs. the starboard rotor.

Figure 4A:
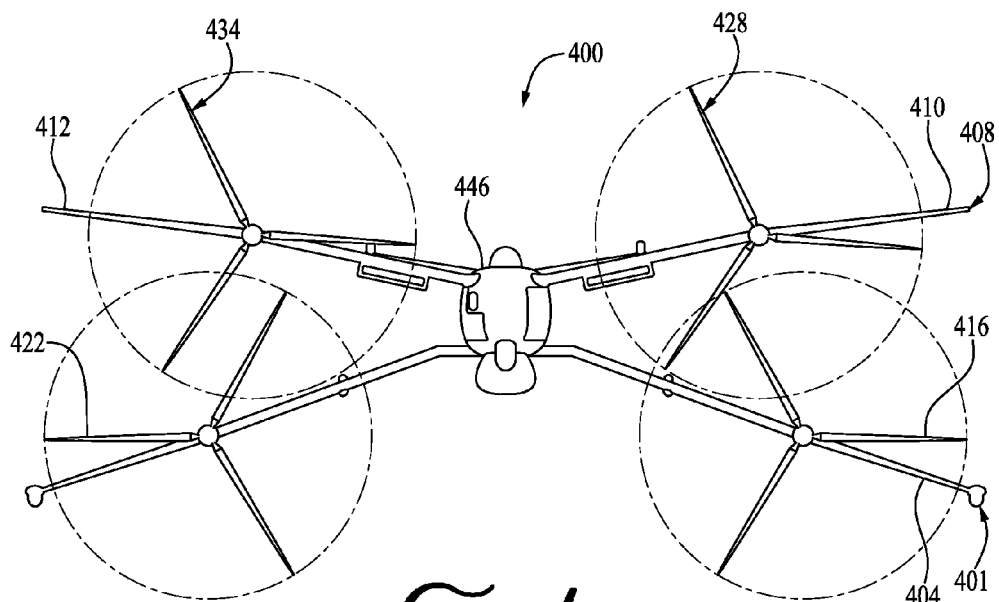
FIGS. 4A, 4B, and 4C are front plan, top plan and port plan views, respectively, of another embodiment of a fixed-wing aircraft that has four rotors and is operable for vertical take-off and landing.
Figure 4B:
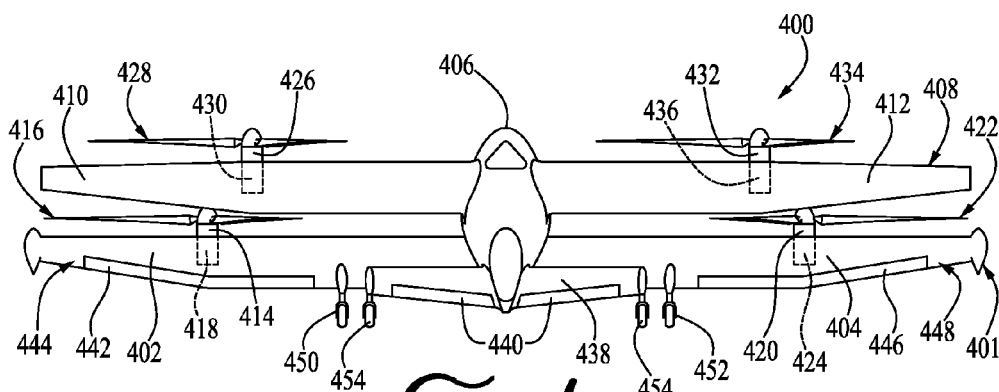
Figure 4C:
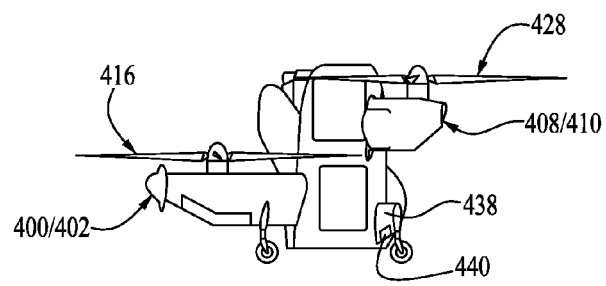

Although FIGS. 3A and 3B are described primarily in relation to a two-rotor fixed-wing aircraft 100, in a non-preferred embodiment such effector control inputs may be utilized to also provide attitudinal and thrust control of a four-rotor fixed-wing aircraft having two wings and a horizontal stabilizer/elevator configuration, such as that illustrated in FIGS. 4A, 4B, and 4C. In such an application, effector controls would preferably reside on one of the two main wings of the four-rotor fixed-wing aircraft.

FIGS. 4A, 4B, and 4C are front plan, top plan and port plan views, respectively, of another embodiment of a fixed-wing aircraft that has four rotors and is operable for vertical takeoff and landing. An aft main wing 401 has aft port and aft starboard wings (402, 404) joined at a fuselage 406. A forward main wing 408 has forward port and forward starboard wings (410, 412) also joined at the fuselage 406. An aft port swash plate 414 is coupled between an aft port rotor 416 and an aft port electric motor 418, the aft port electric motor 418 coupled to the aft port wing 402. An aft starboard swash plate 420 is coupled between an aft starboard rotor 422 and an aft starboard electric motor 424, the aft starboard electric motor 420 coupled to the aft starboard wing 404. A forward port swash plate 426 may be coupled between a forward port rotor 428 and forward port electric motor 430, the forward port electric motor 430 coupled to the forward port wing 410. A forward starboard swash plate 432 may be coupled between a forward starboard rotor 434 and forward starboard electric motor 436, the forward starboard electric motor 436 coupled to the forward starboard wing 412. In one embodiment, a horizontal stabilizer 438 may be coupled to the fuselage 406, and an elevator 440 may be rotatably coupled to horizontal stabilizer 438, with the fuselage 406 coupled between the forward port wing 410 and forward starboard wing 412. A port aileron 442 may be rotatably disposed on a trailing edge 444 of the aft port wing 402; and a starboard aileron 446 may be rotatably disposed on a trailing edge 448 of the aft starboard wing 404. Aft and forward landing gear (450, 452) may be attached to the aft port wing 402 and aft starboard wing 404, respectively. A third landing gear 454 may be attached to the horizontal stabilizer 438, such as on opposite longitudinal sides of the horizontal stabilizer 438.

For purposes of the previous discussion and following table descriptions, the described pitch, yaw, and roll movements resulting from "symmetric" and "differential" cyclic rotor control, collective rotor control and motor RPM, assume symmetric or near symmetric rotor placement about the center of mass of the air vehicle, assume identical or near identical electric motor outputs and assume symmetric or near symmetric parasitic drag of the aircraft's structure about its center of mass in horizontal and vertical flight modes. In real-world applications, bias or trim effector inputs may be provided to compensate for weight-balance deviation and for non-symmetrical parasitic drag of the aircraft's structure, to maintain the effectiveness of the following effector controls:

Symmetric Collective effector control—Application of the same or similar collective control inputs as between two sets of rotors by respective swash plates (where a set may be a single rotor) that results in the same or similar rotor force vectors as between such sets.

Asymmetric Collective effector control—Application of dissimilar collective control inputs as between two sets of rotors by respective swash plates (where a set may be a single rotor) that results in dissimilar rotor force magnitude and but in the same or similar vector force direction as between such sets.

Asymmetric Cyclic effector control—Application of dissimilar cyclic control inputs as between two sets of rotors by respective swash plates (where a set may be a single rotor) that results in dissimilar rotor rotational moment magnitude and in the opposite rotational moment direction as between such sets.

Symmetric Cyclic effector control—Application of the same or similar cyclic control inputs as between two sets of rotors by respective swash plates (where a set may be a single rotor) that results in the same or similar rotor rotational moment magnitude and direction as between such sets. Symmetric Cyclic effector control may also be used to refer to all rotors having the same rotational moment magnitude and in the same or similar rotational moment direction.

Differential Motor RPM—Application of dissimilar rotational velocities as between two sets of motors (where a set may be a single motor), where such sets of motors are configured to translate such dissimilar rotational velocities into proportionally dissimilar rotor force magnitudes as between sets but in the same or similar vector force direction.

FIG. 5 describes three flight control configuration embodiments that may each be used to affect pitch, yaw, and roll control of the four-rotor fixed-wing aircraft first illustrated in FIGS. 4A, 4B, and 4C during the vehicle's vertical flight orientation, such as during takeoff and hover. Pitch to horizontal flight from vertical orientation may be accomplished by means of at least two effector embodiments. In flight control configuration Embodiment 1 (line 1), pitch control of the fuselage 406 may be provided in response to providing differential motor RPM control between the aft port rotor 416 and/or the aft starboard rotors 422 on the one hand, and the forward port rotor 428 and/or the forward starboard rotor 434 on the other. In Embodiment 2 (line 1), pitch control of the fuselage may be provided in response to providing asymmetric collective control between the aft port rotor 416 and aft starboard rotor 422 on the one hand, and the forward port rotor 428 and forward starboard rotor 434 on the other.

FIG. 5 also describes two different effector control embodiments that may be used to accomplish slow horizontal translation when the air vehicle 400 is in a vertical orientation mode. In Embodiment 1 (line 2), slow horizontal translation of the aft and forward port wings (402, 410) and aft and forward starboard wings (404, 412) is induced by providing symmetric cyclic control of all rotors (416, 428, 422, and 434). In Embodiment 2 (line 2), slow horizontal translation in the vertical orientation mode may be provided by generating different collective between the aft port and starboard rotors (416, 422) on the one hand, and forward port and starboard rotors (428, 434) on the other hand. In an alternative embodiment, the horizontal translation may be provided by generating different collective between the aft and forward port rotors (416, 428) on the one hand and aft and forward starboard rotors (422, 434) on the other hand.

A static non-zero roll station-keeping control of the fuselage may be accomplished during a hover/vertical orientation mode by means of at least two effector embodiments. In Embodiment 1 (line 3), asymmetric collective control may be generated between aft and forward starboard rotors (422, 434) on the one hand and aft and forward port rotors (416, 428) on the other, each approximately concurrently with symmetric cyclic control of the rotors (422, 434, 416, 428). In Embodiment 2 (line 3) differential motor RPM control may be provided between aft and forward starboard rotors (422, 412) on the one hand, and aft and forward port rotors (416, 428) on the other, each approximately concurrently with non-zero symmetric cyclic control of all rotors (422, 434, 416, 428).

A static non-zero pitch angle station-keeping control of the fuselage may also be accomplished during the hover/vertical orientation mode by means of at least two effector embodiments. In Embodiment 1 (line 4) illustrated in FIG. 5, asymmetric collective control may be generated between the aft port and aft starboard rotors (416, 422) on the one hand and forward port and forward starboard rotors (416, 434) on the other, approximately concurrently with symmetric cyclic control of aft and forward port rotors (416, 428) on the one hand and aft and forward starboard rotors (422, 434) on the other. In Embodiment 2 (line 4), the pitch angle station-keeping may be provided by generating differential motor RPM control between the aft port rotor 416 and aft starboard rotor 422 on the one hand, and the forward port rotor 428 and forward starboard rotor 434 on the other, approximately concurrently with symmetric cyclic control of the aft port rotor 416, forward port rotor 428, aft starboard rotor 422 and forward starboard rotor 434.

A yaw moment may be induced about the fuselage during the hover/vertical orientation mode by means of at least two effector embodiments. In Embodiment 1 (line 5) of FIG. 5, the yaw moment may be induced in response to asymmetric cyclic control of the aft and forward port rotors (416, 428) on the one hand and aft and forward starboard rotors (422, 434) on the other hand. In Embodiment 2 (line 5), the yaw moment may be induced in response to differential motor RPM control of the aft port rotor 416 and forward starboard rotor 434 on the one hand, and forward port rotor 428 and aft starboard rotor 422 on the other.

Vertical takeoff may be provided by means of at least two effector embodiments. In Embodiment 1 (line 6), the takeoff may be induced in response to symmetric motor RPM control of all rotors (422, 434, 416, 428). In Embodiment 2 (line 6) of FIG. 5, takeoff may be induced in the fuselage in response to symmetric collective control of all rotors (422, 434, 416, 428).

Although FIG. 5 describes two aircraft configuration embodiments for affecting various aircraft attitudinal and translation controls, the effector controls in one aircraft configuration embodiment may be used in another embodiment. For example, in any particular aircraft configuration embodiment, slow horizontal translation may be accomplished with either symmetric cyclic (non-zero) rotor control or asymmetric collective rotor control, as described in FIG. 5, line 2.

FIG. 6 describes three flight control embodiments that may be used collectively to affect pitch, yaw, and roll control of the four-rotor fixed-wing aircraft first illustrated in FIGS. 4A, 4B, and 4C during the vehicle's horizontal flight orientation, such as when the aft and forward main wings (401, 408) are providing all or substantially all of the vertical lift during cruise or loiter. Pitch control of the fuselage to transition from horizontal flight orientation to vertical flight orientation, such as in preparation for landing or hover, may be induced about the fuselage during flight in its horizontal flight orientation by least three different aircraft control configuration embodiments described in FIG. 6. In flight control Embodiment 1, pitch to vertical flight may be induced by providing asymmetric collective control between aft port and aft starboard rotors (416, 422) on the one hand, and forward port and forward starboard rotors (428, 434) on the other, and by providing approximately current and complementary elevator actuation. In flight control Embodiment 2 (line 1), pitch control of the aircraft is accomplished in response to providing asymmetric collective control between aft port and aft starboard rotors (416, 422) on the one hand, and forward port and forward starboard rotors (428, 434) on the other, without the use of elevator actuation. In flight control Embodiment 3 (line 1), pitch control for the fuselage may be induced by providing differential motor RPM control between the aft port and aft starboard motors (418, 424) on the one hand and the forward port and forward starboard rotors (428, 434) on the other.

Pitch control of the fuselage may be provided during flight while in the aircraft's horizontal orientation using least three different aircraft control configuration embodiments described in FIG. 6. In flight control Embodiment 1 (line 2), pitch may be induced by providing elevator control without the use of asymmetric collective rotor control. In Embodiment 2 (line 2), pitch control may be induced by providing asymmetric collective control between aft port and aft starboard rotors (416, 422) on the one hand, and forward port and forward starboard rotors (428, 434) on the other, preferably without the use of elevator actuation. In Embodiment 3 (line 2), pitch control for the fuselage may be induced by providing differential motor RPM control between the aft port and aft starboard motors (418, 424) on the one hand and the forward port and forward starboard rotors (428, 434) on the other, preferably without the benefit of elevator actuation or asymmetric collective rotor control.

A roll moment may be induced about the fuselage during flight in its horizontal flight orientation by least three different aircraft control configuration embodiments described in FIG. 6. In flight control Embodiment 1 (line 3), a roll may be induced by providing actuation of the port and starboard ailerons (442, 446) rotatably coupled to the aft port wing 402 and aft starboard wing 404, respectively. In an alternative embodiment, port and starboard ailerons may also be provided on the forward port and starboard wings (410, 412) or on both forward and main wings (401, 408). In Embodiment 2 (line 3), roll control may be induced by providing asymmetric cyclic rotor control of the aft and forward port rotors (416, 428) on the one hand, and the aft and forward starboard rotors (422, 434) on the other. In Embodiment 3 (line 3), roll control may be provided by differential motor RPM control of the forward and aft port motors (430, 418) on the one hand, and forward and aft starboard motors (436, 424) on the other hand.

A yaw moment may be induced about the fuselage during flight in its horizontal flight orientation by least three different aircraft control configuration embodiments described in FIG. 6. In flight control Embodiments 1 and 2 (line 4), a yaw moment may be induced about the fuselage in response to asymmetric collective control between the aft and forward port rotors (416, 428) on the one hand, and the aft and forward starboard rotors (422, 434) on the other hand. In Embodiment 3 (line 4), the yaw moments may be induced in response to differential motor RPM control between the aft and forward port rotors (416, 428) on the one hand, and the aft and forward starboard rotors (422, 434) on the other.

A coordinated turn of the forward and aft main wings may also be accomplished during flight in its horizontal flight orientation by least three different aircraft control configuration embodiments described in FIG. 6. In flight control Embodiment 1 (line 5), a coordinated turn of the aircraft 400 may be accomplished by providing asymmetric aileron control between the port aileron 424 and the starboard aileron 446, concurrently with asymmetric collective rotor control between aft and forward port rotors (416, 428) on the one hand and aft and forward starboard rotors (422, 434) on the other. In aircraft configuration Embodiment 2 (line 5), coordinated turn of the aircraft 400 may be accomplished by providing asymmetric cyclic control between the aft and forward port rotors (416, 428) on the one hand, and aft and forward starboard rotors (422, 434) on the other, approximately concurrently with providing asymmetric collective control between aft and forward port rotors (416, 428) on the one hand and aft and forward starboard rotors (422, 434) on the other.

Figure 7A:
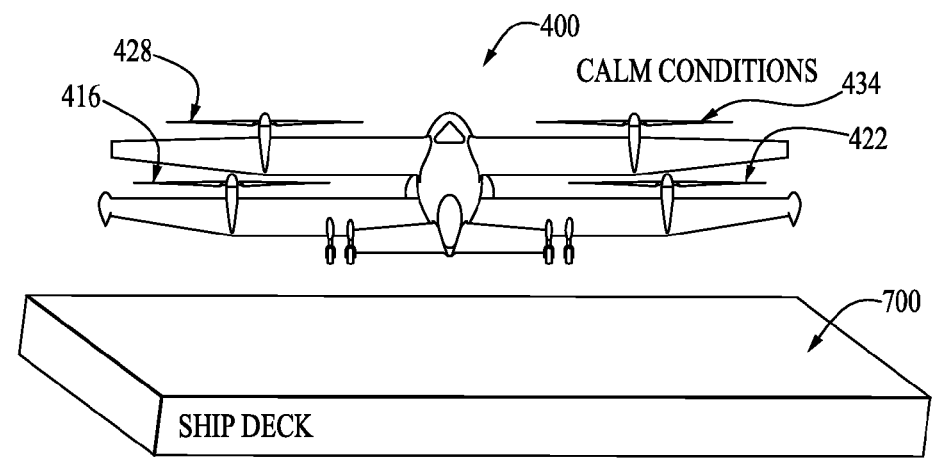
FIGS. 7A, 7B, and 7C illustrate one embodiment of vehicle orientation and control of the four-rotor fixed-wing aircraft during calm conditions, horizontal-vectored wind conditions, and deck roll conditions, respectively.
Figure 7B:
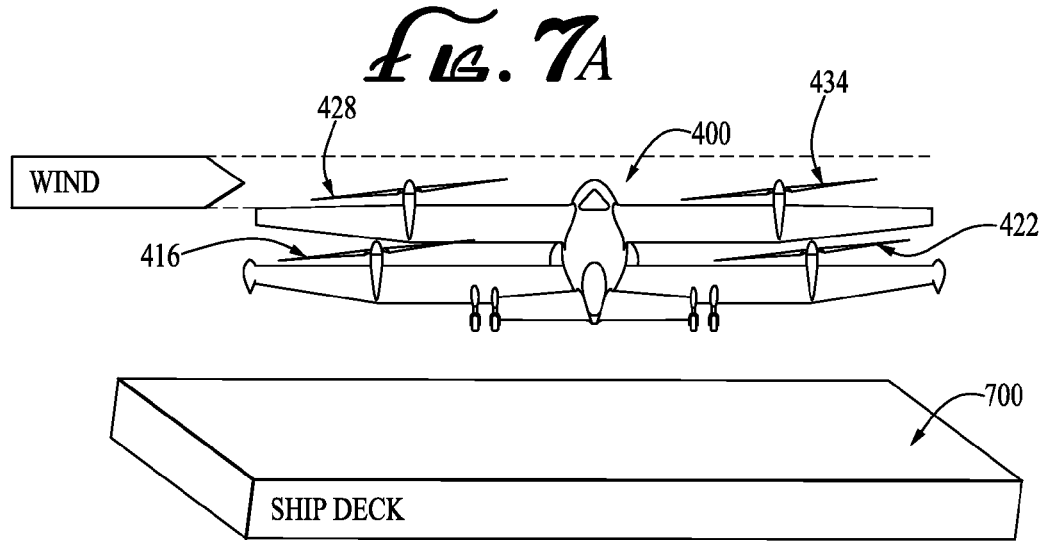
Figure 7C:
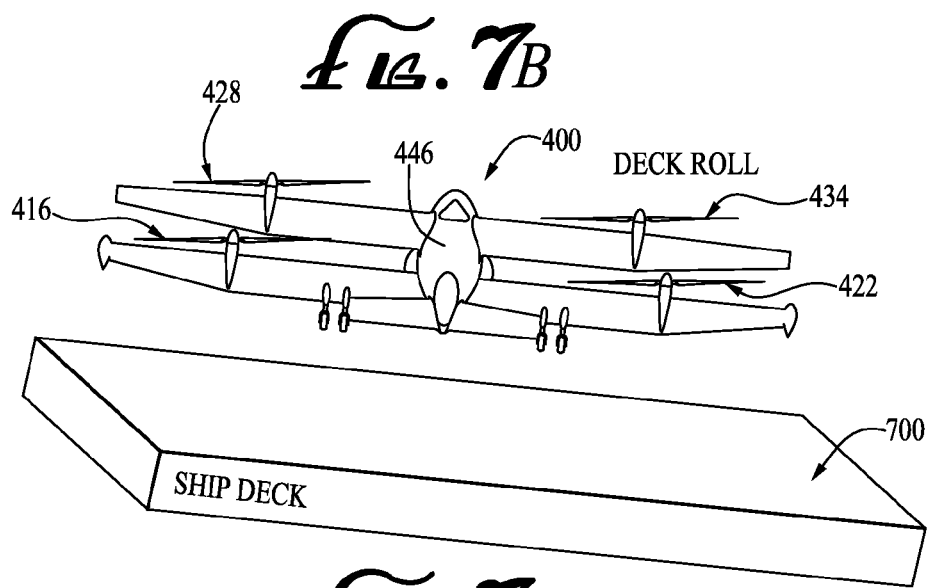

FIGS. 7A, 7B, and 7C illustrate the affect of several of the effector control modes described in FIG. 5 for use in different weather conditions that may be encountered when attempting to land on a moving ship deck surface. More particularly, FIG. 7A illustrates aircraft 400 in a vertical orientation while hovering over a ship deck 700 in calm wind conditions. The aft and forward port rotors (416, 428) and aft and forward starboard rotors (422, 434) may maintain the aircraft 400 in a static hover position and in level flight (i.e, pitch and roll angles at 0° with respect to a horizontal plane) such as by the use of symmetric collective control and/or motor RPM control of each rotor (416, 422, 428, 434) and symmetric cyclic control of each rotor (416, 422, 428, 434) at 0° relative to a vertical axis. In FIG. 7B, wind is illustrated off of the aircraft's 400 port wings (402, 410), necessitating active flight control such as that described in Embodiments 1 and 2 in line 2 of FIG. 5, which describe slow horizontal translation control of the fuselage while in the hover/vertical orientation. In an alternative embodiment, such as when the wind is coming horizontally from the forward position/orientation, Embodiments 1 and 2 in line 2 of FIG. 5 may also be used to counteract wind forces impinging on the aircraft to maintain a static lateral position above the ship deck by adjusting symmetric cyclic to provide a thrust in the forward (x-axis) direction. In FIG. 7C, no wind is illustrated, but the ship deck is illustrated at an instantaneous pitch and roll angle from level suggesting the use of dynamic pitch and roll effector control of the aircraft 400 to accomplish a landing using, for example, a combination of control inputs selected from embodiments described in lines 3 and 4 of FIG. 5. For example, active pitch and roll angle management may be induced in the fuselage 446 as the aircraft 400 descends, to reduce undesirable lateral translation during descent, but allowing for proper orientation of the landing gear (450, 452 and 454) upon contact with the ship deck 700 even if the ship deck is rolling.

Figure 8A:
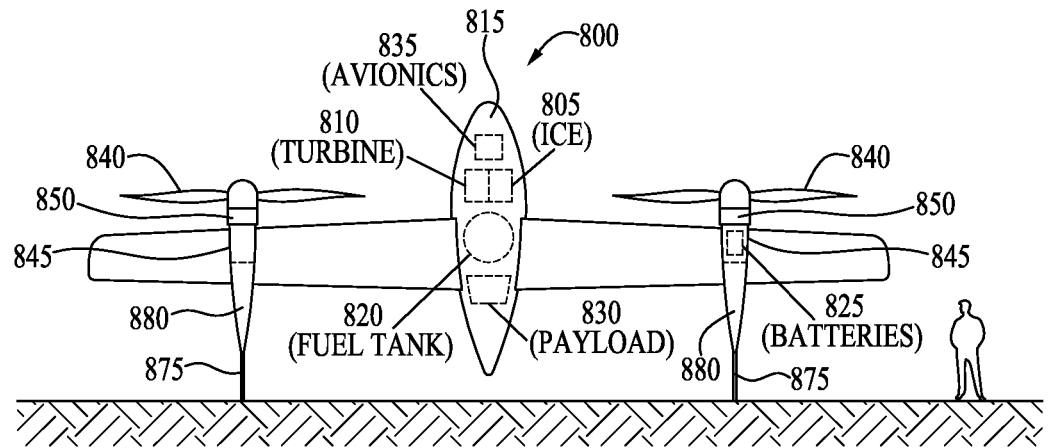
Figure 8B:
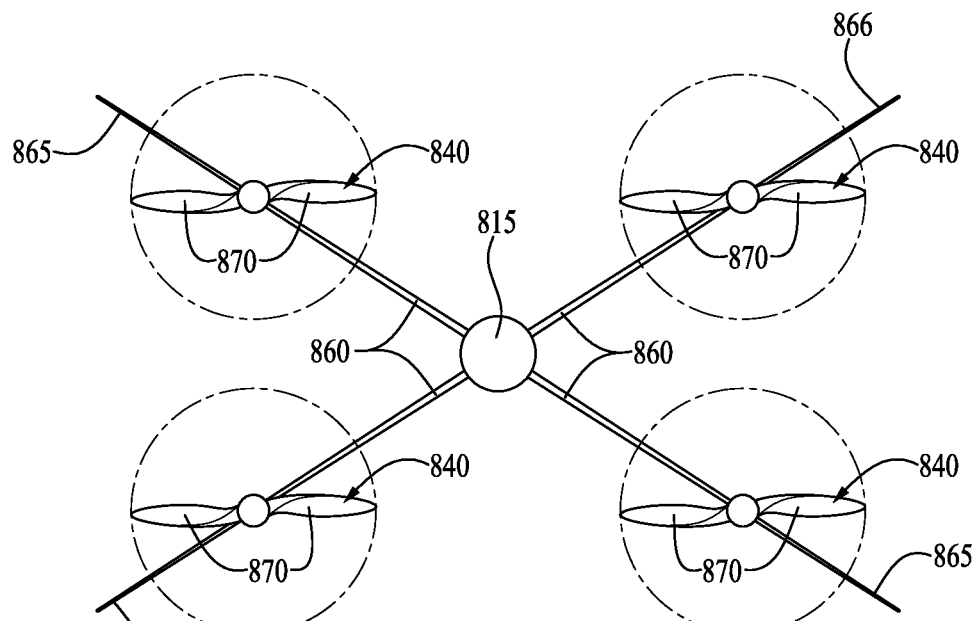

FIGS. 8A, 8B, 8C illustrate another embodiment of a four-rotor fixed-wing aircraft that has a turbine and internal combustion engine ("ICE") to charge batteries that provide power to electric motors that drive the rotors. The aircraft 800 may have the internal combustion engine 805 and turbine 810 disposed within the fuselage 815. The internal combustion engine may be, for example, a diesel or jet-fueled engine, with one or more fuel tanks 820 available for the turbine and ice (810, 805) providing for diesel and jet fuel storage. The ICE and turbine may drive one or more generators that are electrically coupled to batteries 825. A payload 830 having, for example, sensors, and avionics 835 for remote communication and control of the aircraft may also be disposed in the fuselage 815. Each rotor 840 may be driven by a respective electric motor 845 as guided by a respective swash plate 850, with each electric motor 845 obtaining power either directly from the batteries 825, the electrical power generated by the ICE 805 or turbine 810 or through some combination of batteries, ICE, or turbine (825, 805, 810). For example, during cruise or loiter, each electric motor 845 may obtain power from the ICE 805. During vertical takeoff, each electric motor 845 may obtain power from both the ICE 805 and turbine 810, or from the ICE, turbine and batteries, collectively (805, 810, 825).

The aircraft 800 may be provided with four wings 860 in an X-wing configuration with the fuselage 815 in the center. The rotors may be arranged symmetrically about the fuselage 815, one rotor on each wing 860, and preferably spaced equidistant from the fuselage 815 along a respective wing 860. In one embodiment, each rotor 840 is disposed at a respective wingtip 865 for enhanced attitudinal control of the fuselage 815. Although two blades 870 are provided for each rotor 840, each rotor may be a three or four-bladed rotor 840. Four landing gear 875 may extend from engine nacelles or other supports 880 to enable vertical take off and landing of the aircraft 800. The landing gear 875 may also extend from the fuselage 815, from two or more wings 860 or from some combination of the fuselage 815, wings 860 or supports 880.

FIG. 9 illustrates one embodiment of a system for use with a fixed-wing aircraft having cyclic and collective control of multiple rotors that are configured for vertical takeoff and landing via a shipboard launch, and on-station loiter over land using satellite communications. Aircraft 900 may takeoff vertically from a vertical flight orientation from a ship deck 905 using thrust controlled by means of motor RPM control or collective rotor control, or both, with takeoff electric power provided to electric motors using a combination of the internal combustion engine generator, turbine generator, and previous-stored battery power for supplemental electric power. The aircraft 900 may pitch forward to establish a horizontal flight orientation 910 using a flight control configuration embodiment that may include i) differential motor RPM control, ii) or asymmetric collective control (see FIG. 5, line 1).

As a horizontal flight orientation is established, the aircraft may enter a fuel-efficient horizontal orientation cruise mode 915 (verses vertical orientation cruise), preferably utilizing electrical power from one of only the internal combustion engine generator (see FIGS. 8A, 8B, 8C) to drive the rotors, with primary lift being provided by the aircraft's wings for flight to a loiter station 910. In an alternative embodiment, either the turbine generator or battery or both may be used for cruise power should the internal combustion engine generator be insufficient or unavailable or if additional electrical power is desired. In aircraft control embodiments, pitch control about the fuselage may be accomplished using i) elevator actuation, ii) asymmetric collective control, or iii) differential motor RPM control as described in line 2 of FIG. 6. Roll control about the fuselage may be accomplished using a) ailerons, b) asymmetric cyclic rotor control, or c) differential motor RPM control as described in line 3 of FIG. 6. Yaw control about the fuselage may be accomplished using asymmetric collective control or differential motor RPM control as described in line 4 of FIG. 6. Coordinated turns may be facilitated during horizontal orientation cruise for using x) ailerons and asymmetric collective rotor control, y) asymmetric cyclic rotor control and asymmetric collective rotor control, or z) differential motor RPM control.

Communication with a command and control station, such as a ship 920, may be facilitated via a satellite 925.

Upon the conclusion of the on-station loiter 910, the aircraft may return 930 to a landing destination such as, for example, the ship deck 905. Upon reaching the landing destination, the aircraft may pitch to the horizontal flight orientation 935 using, for example, differential motor RPM control or asymmetric collective control to make the flight orientation change, as effector embodiments are described in FIG. 5, line 1. Slow horizontal translation of the aircraft may be used for final landing position control using symmetric cyclic (non-zero) rotor control or asymmetric collective rotor control as described in FIG. 5, line 2. If the landing destination is not level, or if the ship deck is heaving, the aircraft may match the pitch and roll angle of the ship deck 905 as the aircraft descends using the effector control embodiments described in FIG. 5, lines 3 and 4.

In an alternative embodiment, the aircraft 900 is a two-rotor aircraft as illustrated in FIGS. 1 and 2A, 2B, 2C and with effectors as configured in FIGS. 3A and 3B. As in FIG. 9, the fixed-wing aircraft would be may takeoff vertically from a vertical flight orientation from a ship deck 905 using thrust controlled by means of motor RPM control or collective rotor control, or both. The aircraft may pitch forward to establish a horizontal flight orientation 910 using a flight control configuration embodiment that may include i) symmetric cyclic control, ii) or symmetric cyclic control with symmetric elevons actuation (see FIG. 3B, line 1). As a horizontal flight orientation is established, the aircraft may enter a fuel-efficient horizontal orientation cruise mode 915 (verses vertical orientation cruise), with vertical lift created primarily from its wings (115, 120)(see FIG. 1) for flight to a loiter station 910. In aircraft control embodiments, pitch control about the fuselage may be accomplished using i) symmetric cyclic control or ii) symmetric rotor control and symmetric elevons actuation. Roll control about the fuselage may be accomplished using a) asymmetric cyclic rotor control, or b) asymmetric cyclic control. Yaw control about the fuselage may be accomplished using x) asymmetric cyclic rotor control or y) asymmetric cyclic rotor control and asymmetric elevon actuation. A coordinated turn may be facilitated using I) asymmetric cyclic rotor control with asymmetric collective rotor control, II) asymmetric elevon actuation with asymmetric collective rotor control, or III) asymmetric cyclic rotor control with asymmetric collective and asymmetric elevons actuation, or IV) asymmetric cyclic rotor control with asymmetric elevons actuation and differential RPM control.

Upon the conclusion of the on-station loiter 910 by the 2-rotor aircraft, it may return 930 to a landing destination such as, for example, the ship deck 905. Upon reaching the landing destination, the aircraft may pitch to the horizontal flight orientation using, for example, either symmetric cyclic rotor control or symmetric cyclic rotor control with symmetric elevons actuation.

Figure 10:
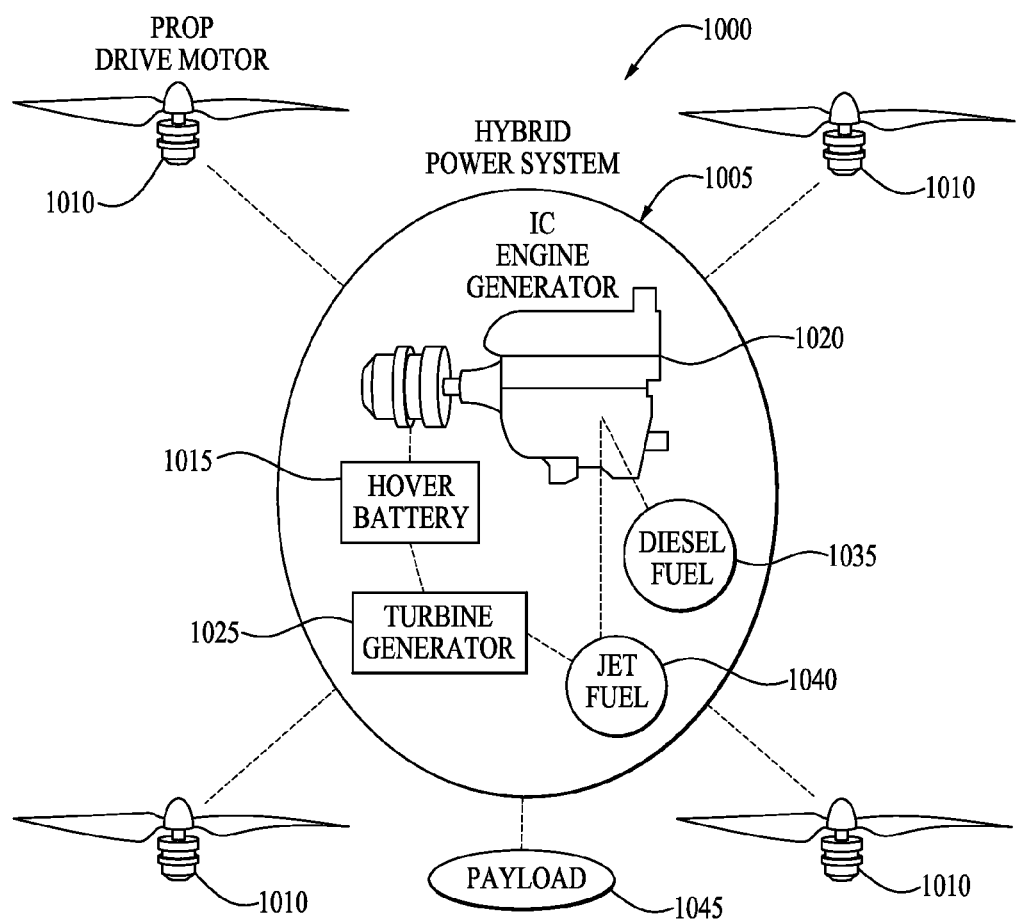
FIG. 10 is a block diagram illustrating one embodiment of the power plant and energy stores for use with a four-rotor fixed-wing aircraft having four electric motors.

FIG. 10 is a block diagram illustrating one embodiment of a hybrid power system having power plant and energy stores for use with a four-rotor fixed-wing aircraft having four electric motors. The aircraft 1000 is illustrated having four electric motors 1005 that are in electrical communication with the hybrid power system 1010 that may consist of a hover battery 1015, an internal combustion engine generator 1020 and a turbine electric generator 1025. Diesel and jet fuel tanks (1035, 1040) may be in liquid communication with the internal combustion engine generator and turbine electric generator, respectively (1020, 1025). A payload 1045, such as image or thermal sensors, transceivers or atmospheric sensors, may be in electrical communication with the hybrid power system 1005.

While various embodiments of the application have been described, it will be apparent to those of ordinary skill in the art that many more embodiments and implementations are possible that are within the scope of this invention.

What is claimed is:

1. A flight control apparatus for a fixed-wing aircraft, comprising:
 a first port wing and a first starboard wing;
 a first port swash plate coupled between a first port rotor and a first port electric motor, the first port electric motor coupled to the first port wing;

a first starboard swash plate coupled between a first starboard rotor and a first starboard electric motor, the first starboard electric motor coupled to the first starboard wing;

a second port wing and second starboard wing;

a second port swash plate coupled between a second port rotor and second port electric motor, the second port electric motor coupled to the second port wing;

a second starboard swash plate coupled between a second starboard rotor and second starboard electric motor, the second starboard electric motor coupled to the second starboard wing; and a horizontal stabilizer coupled to a fuselage and an elevator rotatably coupled to the horizontal stabilizer, the fuselage coupled between the first port wing and second starboard wing;

wherein first starboard and first port rotor pitch, yaw and roll moments are accomplished without the benefit of control surfaces on a wing.

2. The apparatus of claim 1, further comprising:

a port aileron rotatably disposed on a trailing edge of the first port wing; and a starboard aileron rotatably disposed on a trailing edge of the first starboard wing.

3. The apparatus of claim 1, further comprising:

first and second landing gear attached to the first port wing and first starboard wing, respectively.

4. The apparatus of claim 3, further comprising:

a third landing gear attached to the horizontal stabilizer.

\* \* \* \* \*